United States Patent
Roy et al.

(10) Patent No.: US 12,332,929 B2
(45) Date of Patent: Jun. 17, 2025

(54) DATA REPOSITORY MANAGEMENT PLATFORM

(71) Applicant: Dell Products L.P., Round Rock, TX (US)

(72) Inventors: Mainak Roy, Bangalore (IN); Pinaki Dasgupta, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/124,907

(22) Filed: Mar. 22, 2023

(65) Prior Publication Data

US 2024/0320248 A1    Sep. 26, 2024

(51) Int. Cl.
*G06F 16/3331* (2025.01)
*G06F 16/16* (2019.01)

(52) U.S. Cl.
CPC .......... *G06F 16/3331* (2019.01); *G06F 16/16* (2019.01)

(58) Field of Classification Search
CPC .............................. G06F 16/3331; G06F 16/16
See application file for complete search history.

(56) References Cited

U.S. PATENT DOCUMENTS 7,634,471 B2 * 12/2009 Chen ...................... G06F 16/164
707/999.005

2009/0327193 A1 * 12/2009 Eronen ................... G06Q 30/00
707/999.107
2019/0370365 A1 * 12/2019 Chalakov .............. G06F 16/176

OTHER PUBLICATIONS

Cormode, Graham, and Shan Muthukrishnan. "The string edit distance matching problem with moves." ACM Transactions on Algorithms (TALG) 3.1 (2007): 1-19. (Year: 2007).*
Wikipedia, "Edit Distance," https://en.wikipedia.org/w/index.php?title=Edit_distance&oldid=1136415598, Jan. 30, 2023, 7 pages.
The Windows Club, "What is Difference between Partition, Volume and Logical Drive," https://www.thewindowsclub.com/difference-between-partition-volume-logical-drive, Accessed Mar. 16, 2023, 6 pages.

* cited by examiner

*Primary Examiner* — Jay A Morrison
(74) *Attorney, Agent, or Firm* — Ryan, Mason & Lewis, LLP

(57) ABSTRACT

A method comprises receiving an input string comprising one or more identifiers for an operation, and searching at least one data repository for files corresponding to the one or more identifiers. Similarities between the input string and respective ones of the files corresponding to the one or more identifiers are computed, and the files corresponding to the one or more identifiers are ranked based on the computed similarities. The method further comprises grouping at least a portion of the ranked files into at least one group based on the one or more identifiers. At least one division in a logical drive of the at least one data repository is generated, wherein the at least one division corresponds to the at least one group and comprises at least the portion of the ranked files of the at least one group.

20 Claims, 6 Drawing Sheets

DATA REPOSITORY MANAGEMENT PLATFORM

FIELD

The field relates generally to information processing systems, and more particularly to data repository management and control in such information processing systems.

BACKGROUND

Files including, for example, text, images, three-dimensional (3D) models and/or videos may be created and/or used by an enterprise in connection with describing the installation, functioning and/or issue resolution of certain products. These files (also referred to herein as "supporting materials") may be useful when working with other products that have one or more of the same or similar components as the products for which the files were created. However, with current approaches, supporting materials that may be related to a particular product or its components are difficult to find and compile, and are often not re-used. As a result, much wasted time is spent recreating product or component supporting materials even though such materials may have already been generated.

SUMMARY

Embodiments provide a data repository management platform in an information processing system.

For example, in one embodiment, a method comprises receiving an input string comprising one or more identifiers for an operation, and searching at least one data repository for files corresponding to the one or more identifiers. Similarities between the input string and respective ones of the files corresponding to the one or more identifiers are computed, and the files corresponding to the one or more identifiers are ranked based on the computed similarities. The method further comprises grouping at least a portion of the ranked files into at least one group based on the one or more identifiers. At least one division in a logical drive of the at least one data repository is generated, wherein the at least one division corresponds to the at least one group and comprises at least the portion of the ranked files of the at least one group.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
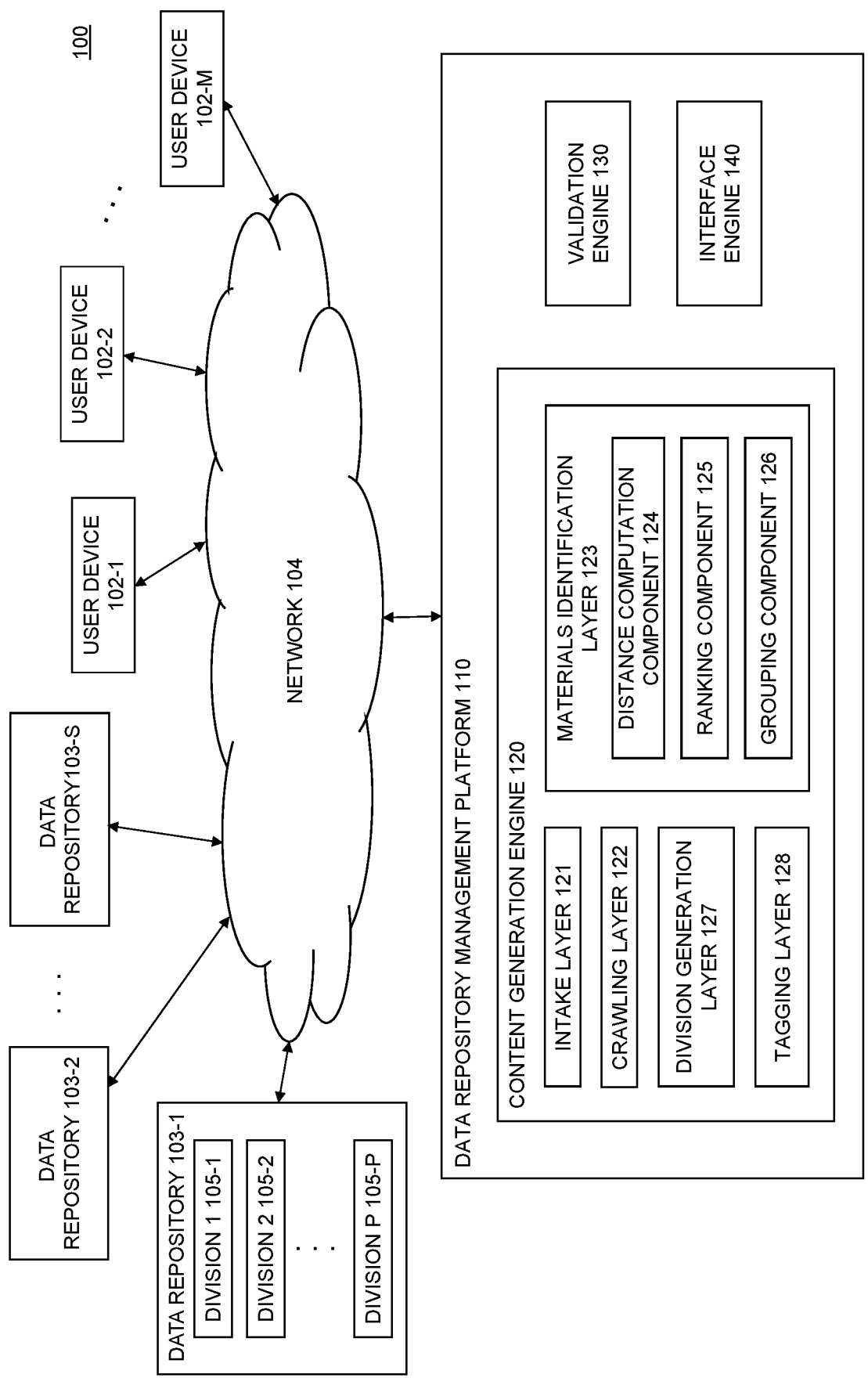
FIG. 1 depicts an information processing system with a data repository management platform for compiling and controlling the compilation of product supporting materials in an illustrative embodiment.

FIG. 1 shows an information processing system 100 configured in accordance with an illustrative embodiment. The information processing system 100 comprises user devices 102-1, 102-2, . . . 102-M (collectively "user devices 102"), and data repositories 103-1, 103-2, . . . , 103-S (collectively "data repositories 103"). The user devices 102 and data repositories 103 communicate over a network 104 with a data repository management platform 110. The variable M and other similar index variables herein such as K, L, P and S are assumed to be arbitrary positive integers greater than or equal to one.

The data repositories 103 comprise, for example, one or more databases or data stores. According to one or more embodiments, the data repositories 103 and other data repositories, data stores or databases referred to herein can be configured according to a relational database management system (RDBMS) (e.g., PostgreSQL). In some embodiments, the data repositories 103 and other data repositories, data stores or databases referred to herein are implemented using one or more storage systems or devices associated with the data repository management platform 110. In some embodiments, one or more of the storage systems utilized to implement the data repositories 103 and other data repositories, data stores or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS (SANs), as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

As can be seen in FIG. 1, the data repository 103-1 includes a plurality of divisions 105-1, 105-2, . . . 105-P (collectively referred to as "divisions 105"). Each of the divisions 105 comprises a division of a logical drive of the data repository 103. For example, a logical drive refers to a logical volume of, for example, a physical hard disk. Common examples of logical drives in, for example, a Windows® operating system (OS), include drives with a letter designation, such as, for example, C:, D:, E:, F:, etc. Once a partition of a disk is formatted and assigned a letter, the formatted partition becomes a logical drive. Divisions of a logical drive refer to, for example, folders or other dividing element that can be used to store files, other folders, and other data. Although not shown in FIG. 1, it is to be understood that the data repositories 103-2 and 103-S similarly include any number of divisions 105. Some non-limiting examples of commercially available data repositories 103 comprise, for example, JIRA®, Rally®, Confluence® or Bugzilla data repositories.

The user devices 102 comprise, for example, desktop, laptop or tablet computers, servers, host devices, storage devices, mobile telephones, Internet of Things (IoT) devices or other types of processing devices capable of communicating with the data repository management platform 110 and data repositories 103 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise.

The terms "user," "customer," "client," "personnel" or "administrator" herein are intended to be broadly construed so as to encompass numerous arrangements of human, hardware, software or firmware entities, as well as combinations of such entities. A portion of the data repository management services discussed herein may be provided for users utilizing one or more machine learning models, although it is to be appreciated that other types of infrastructure arrangements could be used. At least a portion of the available services and functionalities provided by the data repository management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the data repository management platform 110, as well as to support communication between the data repository management platform 110 and connected devices or systems (e.g., user devices 102 and data repositories 103) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the data repository management platform 110.

The data repository management platform 110 in the present embodiment is assumed to be accessible to the user devices 102 and data repositories 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the data repository management platform 110 includes a content generation engine 120, a validation engine 130 and an interface engine 140. The content generation engine 120 includes an intake layer 121, a crawling layer 122, a materials identification layer 123, a division generation layer 127 and a tagging layer 128. The materials identification layer 123 includes a distance computation component 124, a ranking component 125 and a grouping component 126.

As noted hereinabove in the background section, with current approaches, previously created or used supporting materials that may be related to a particular product or its components are difficult to find and compile, and are often not re-used. As a result, much wasted time is spent recreating product or component supporting materials even though such materials may have already been generated. In an effort to address these issues with conventional approaches, illustrative embodiments provide a platform for compiling and controlling the compilation of product supporting materials in data repositories 103. Advantageously, when a query about a product and/or its components is received, the data repository management platform 110 identifies the relevant product and/or its components and corresponding supporting materials from one or more data repositories. Advantageously, the data repository management platform 110 creates one or more logical divisions (e.g., folders, etc.) in which to store the corresponding supporting materials so that the files can be easily accessed by one or more users.

In illustrative embodiments, the intake layer 121 of the data repository management platform 110 receives an input string comprising one or more identifiers for an operation. The operation may include, for example, the installation, removal, troubleshooting and/or execution of a device and/or software or hardware component. According to illustrative embodiments, a query in the form of one or more input strings is entered by a user via a user interface (e.g., graphical user interface (GUI)) on or more of the user devices 102. The user may be, for example, an IT professional of an enterprise seeking enterprise supporting materials in connection with one or more operations of a product or components thereof. The input string specifies one or more identifiers such as, but not necessarily limited to, a product model name, a product model number, a component name, a component model number, a software version identifier and/or a hardware version identifier. Identifiers may also include specifications about the operation that is being performed (e.g., installation, removal, upgrade, etc.) Products may include, but are not necessarily limited to, computing and storage products (e.g., host devices, servers, arrays, systems, etc.) and components of the products may include for example, software and hardware associated with the products (e.g., hard disks drives (HDDs), solid state drives (SSDs), memories (e.g., RAMs), ports, host bus arrays (HBAs), fans, controllers, processors, network interface cards (NICs), routers, switches, firmware, etc.).

The intake layer 121 determines the identifiers (also referred to herein as "tracker identifiers" ("tracker IDs")) present in an incoming query (e.g., input string). For example, referring to block 201 of the operational flow 200 in FIG. 2, the intake layer 121 reads the tracker IDs in an input string of a query. Referring to FIG. 3, in a non-limiting operational example 300 of file ranking and grouping, an input string 301 states "Latitude 5430 SSD Removal/Installation." The identifiers in this particular input string specify a product name ("Latitude"), a model number ("5430"), a component name ("SSD") and a specification about the operation that is being performed ("Removal/Installation").

Figure 2:
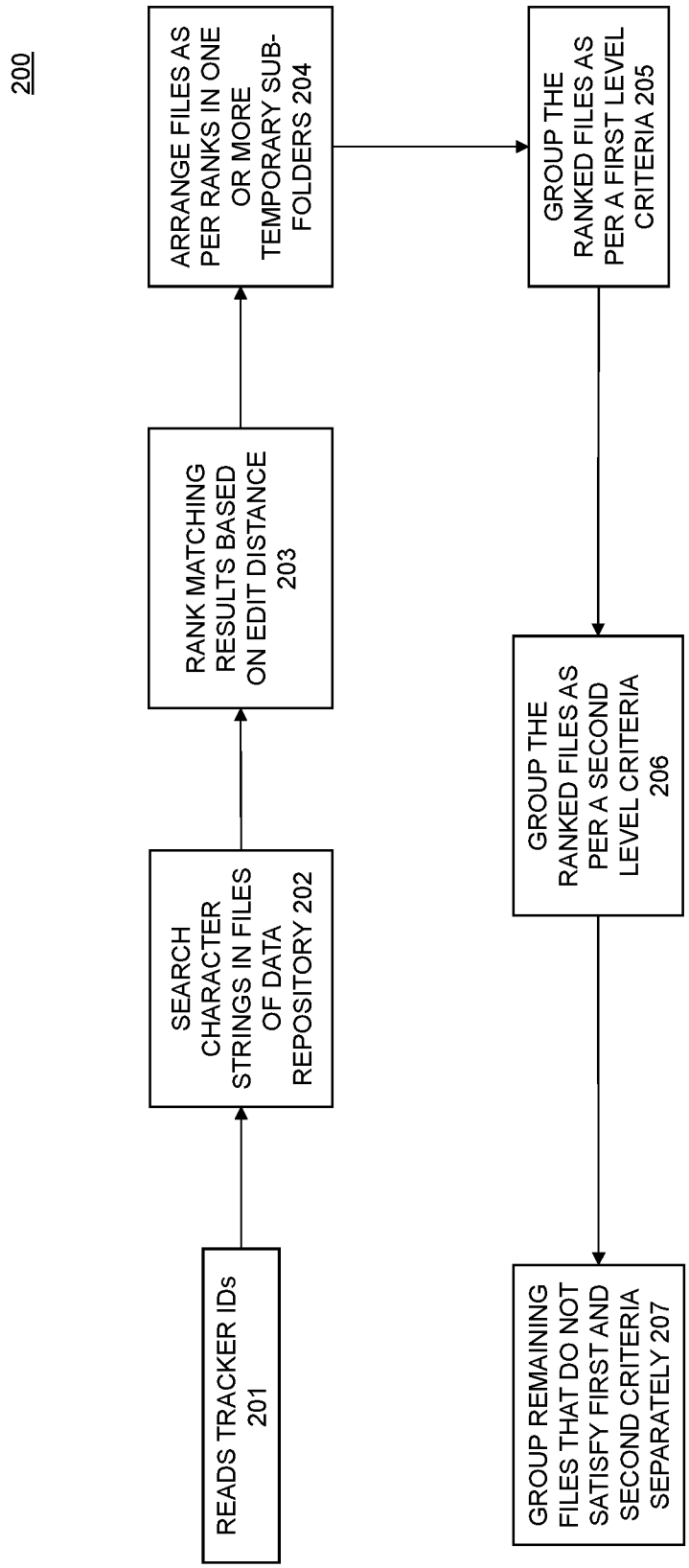
FIG. 2 depicts an operational flow for compiling and controlling the compilation of product supporting materials in an illustrative embodiment.
Figure 3:
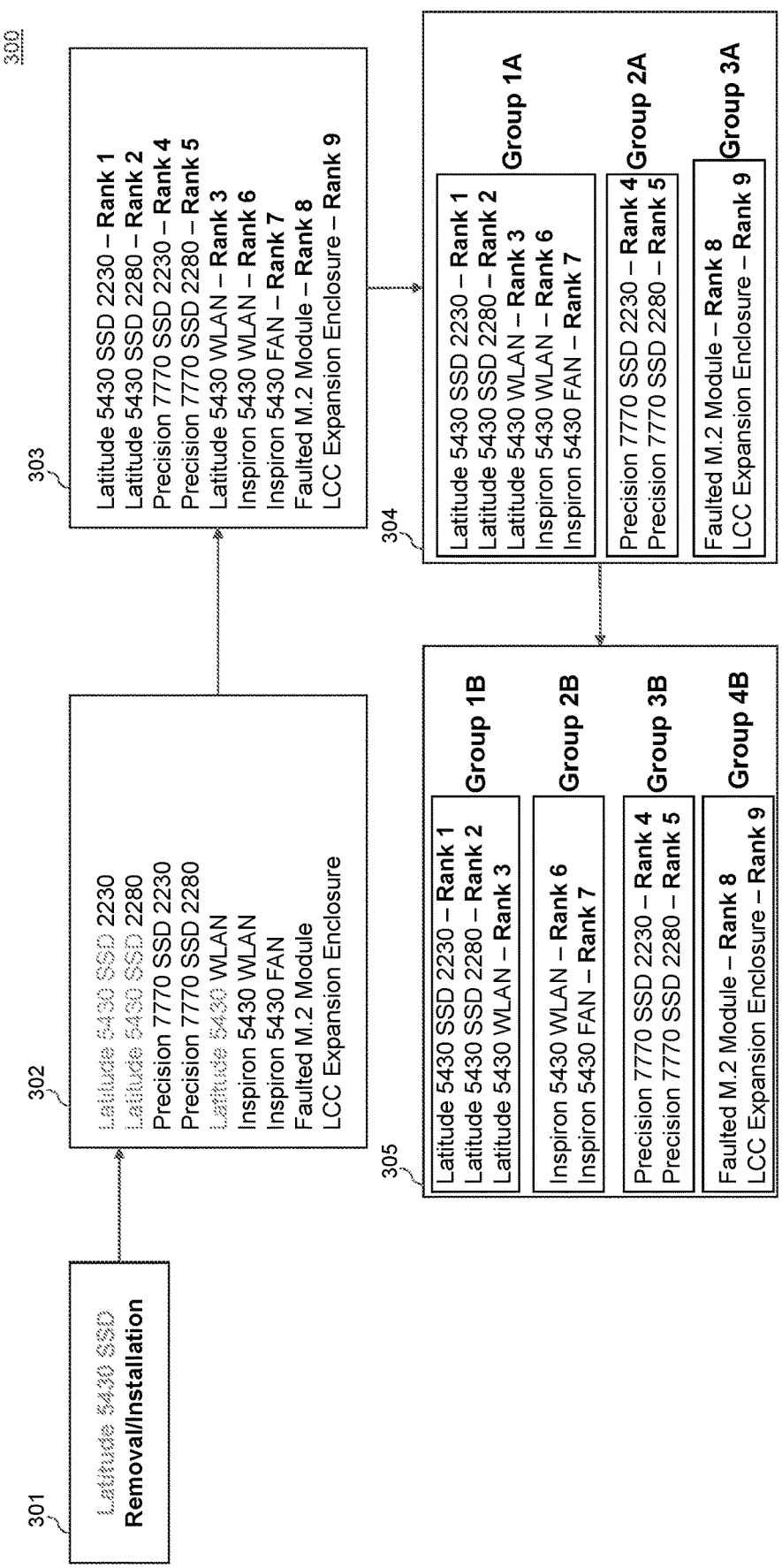
FIG. 3 depicts an operational example of file ranking and grouping in response to a query in an illustrative embodiment.

Based on the determined identifiers, referring to block 202 in FIG. 2, the crawling layer 122 searches character strings in files of one or more of the data repositories 103 to find matches with the tracker IDs in files of the one or more of the data repositories 103. In illustrative embodiments, the crawling layer 122 searches file names, metadata tags, headers and/or bodies of the files in the one or more of the data repositories 103 to find matches with the identifiers. In the case of, for example, image, video and/or three-dimensional (3D) model files, the crawling layer 122 may search, for example, file names, metadata tags and/or headers of the files. In the case of, for example, text files, the crawling layer 122 may search, for example, file names, metadata tags, headers and/or bodies of the files. The content generation engine 120 of the data repository management platform 110 includes the tagging layer 128, which identifies content of metadata tags of the data repository files and/or generates metadata tags for the files of one or more of the data repositories 103.

Referring to FIG. 3, an example listing of matching file strings to the input string "Latitude 5430 SSD Removal/Installation" is shown in block 302. As can be seen in block 302, some of the file strings, which may comprise, for example, file names, include three matching elements (e.g., product name (Latitude), model number (5430) and component (SSD)), while other file strings may include two matching elements, one matching element or no matching elements. The strings with no matching elements may be retrieved based on, for example, learned similarities through one or more machine learning techniques as described in more detail herein.

A distance computation component 124 computes similarities between the input string and respective ones of the files including matches to the identifiers in the input strings. For example, the distance computation component 124 computes a minimum edit distance between the input string and a string of a given matching file. The string of the file can comprise, for example, at least a portion of a file name, a metadata tag of the file, a header of the file and/or a body of the file. The minimum edit distance comprises a minimum number of edit operations required to convert the string of the file into the input string.

In illustrative embodiments, after determining the edit distance, the distance computation component 124 computes a match score based on the edit distance, where a lower number of edit operations corresponds to a higher match score, and a higher number of edit operations corresponds to a lower match score. For example, if the edit distance value is 1 (e.g., 1 edit operation) for a given file string, the distance computation component 124 may assign a match score of 100 to the given file.

In an illustrative embodiment, to account for different orders of two or more character strings indicating the same system, the distance computation component 124 may discount an order of two or more character combinations in each of the input string and the string of the file wherein computing the minimum edit distance. For example, for an input string specifying a model name and model number (e.g., "Latitude 5310"), the distance computation component 124 is configured to discount the order of model name and model number, and assign a match score of 100 to file strings that specify the same model name and same model number regardless of the order in which the model name and model number are specified (e.g., file strings specifying "Latitude 5310" and "5310 Latitude" will each be assigned a match score of 100).

In illustrative embodiments, the distance computation component 124 sorts the input string and the retrieved file strings (e.g., file strings determined to have one or more matching identifiers with the input string and/or deemed to be related based on one or more machine learning techniques). The distance computation component 124 determines the lengths of each string in respective pairs of input and file strings and creates matrices having dimensions of (X+1)x(Y+1) where X and Y are string lengths of the input string and respective ones of the file strings. The distance computation component 124 traverses through a matrix for each input and file string pair, and counts the minimum number of edit operations to convert a given file string to the input string. The distance computation component 124 may temporarily store the values for the minimum number of edit operations for each file string in a cache or other temporary storage.

Once the minimum number of edit operations is determined for each file string, the distance computation component 124 determines the maximum string length between the input string and a given file string, divides the edit distance (e.g., minimum number of edit operations) by maximum string length, subtracts the quotient from 1, and multiplies the result by 100 to determine match score. The embodiments are not necessarily limited to above methods for computing edit distance, and other techniques may be used. Some non-limiting examples of edit distance algorithms that may be used at least in part when computing edit distance include Levenshtein distance, longest common subsequence (LCS) distance, Hamming distance, Damerau-Levenshtein distance and Jaro distance.

Referring to block 203 of FIG. 2, the ranking component 125 of the materials identification layer 123 ranks the matching results (e.g., file strings determined to have one or more matching identifiers with the input string and/or deemed to be related based on one or more machine learning techniques) based on their computed edit distances (e.g., match score). For example, the matching results are ranked in descending order according to match score, where the strings with the highest match score to the input string (lowest edit distance) being ranked first. Referring to block 303 in FIG. 3, the file strings and their corresponding ranks are shown based on their edit distances (e.g., match score) with respect to the input string "Latitude 5430 SSD Removal/Installation." As can be seen, the file with the file string "Latitude 5430 SSD 2230" includes the most characters that are similar to the input string and is ranked highest, while lower ranked strings progressively have less similar characters with respect to the input string. Referring to block 204 of FIG. 2, the division generation layer 127 generates at least one temporary division (e.g., temporary folder) in the logical drive of at least one of the data repositories 103, wherein the at least one temporary division comprises the ranked files.

Following ranking, the grouping component 126 of the materials identification layer 123 groups at least a portion of the ranked files into one or more groups based on one or more identifiers in the input string. In more detail, the ranked files are grouped according to different criteria levels. In one or more embodiments, the criteria for forming the groups may be pre-configured based on one or more conditions established by, for example, an enterprise or other entity. In some embodiments, the criteria is provided by a user via a user device 102 and the intake layer 121 during transmission of the initial query comprising the input string. In addition or alternatively, criteria for grouping ranked files can be pre-defined based on units within an enterprise.

Referring, for example, to blocks 205 and 206 of FIG. 2, the ranked files are grouped according to a first level criteria and a second level criteria. For example, referring to blocks 304 and 305 of FIG. 3, the ranked files are grouped according to product model number (block 304), and then according to product model name (block 305). As can be seen, each of the files having a file string with the product model number "5430" are grouped in Group 1A, each of the files having a file string with the product model number "7770" are grouped in Group 2A and files with file strings that do not specify a product model number are grouped in Group 3A. Then referring to block 305, each of the files having a file string with the product model number "5430" and the product model name "Latitude" are grouped in Group 1B, each of the files having a file string with the product model number "5430" and the product model name "Inspiron" are grouped in Group 2B, each of the files having a file string with the product model number "7770" and the product model name "Precision" are grouped in Group 3B and files with file strings that do not specify a product model number or product model name are grouped in Group 4B. As per block 207 of FIG. 2, files that do not satisfy the first and second criteria (e.g., Groups 3A and 4B) are grouped separately.

It is to be understood that the criteria (e.g., product model number and product model name) discussed in connection with FIG. 3 is illustrative and different types and numbers of criteria may be used for grouping ranked files. For example, more or less criteria for grouping files can be used, and criteria is not necessarily based on product model number and/or product model name, and can be based on other factors including, but not necessarily limited to, component name, component model number, software version, hardware version, etc.

In illustrative embodiments, the grouping component 126 groups one or more subsets of the ranked files into one or more groups corresponding to one or more identifiers from an input string. The respective files of the one or more subsets comprise a string including the one or more identifiers. In some embodiments, respective files of the one or more subsets lack a string including the one or more identifiers.

In illustrative embodiments, the grouping component 126 executes a string match algorithm such as, for example, exact( ) in Python, to match the designated criteria with the file string (e.g., file name in a non-limiting example). The grouping component 126 groups the files in descending order according to, for example, match score and in satisfaction of the criteria via the string match algorithm (e.g., Groups 1A-3A in FIG. 3). The string match algorithm can be used to further group the files into additional groups (e.g., Groups 1B-4B) based on additional criteria.

The division generation layer 127 generates divisions 105 (e.g., folders) in a logical drive (e.g., letter drive) of one or more of the data repositories 103, wherein the divisions 105 correspond to respective groups formed by the grouping component 126 and comprise the ranked files of the respective groups. For example, in connection with the operational example 300 in FIG. 3, the division generation layer 127 generates a divisions 105 for Groups 1B, 2B, 3B and 4B. In addition, the division generation layer 127 can also generate divisions 105 for Groups 1A, 2A and 3A. In one or more embodiments, the divisions 105 for Groups 1B, 2B, 3B and 4B are generated as sub-divisions (e.g., subfolders) in one or more of the divisions (e.g., folders) for Groups 1A, 2A and 3A. In illustrative embodiments, the interface engine 140 implements one or more application programming interfaces (APIs) and/or programmatic interfaces to interface with the one or more data repositories 103 and their respective operating systems (OSs) to automatically generate the divisions 105. It is to be understood that some divisions 105 may already be present in the data repositories 103 prior to division generation by the division generation layer 127, and that divisions created by the division generation layer 127 can be in addition to pre-existing divisions 105 in the one or more data repositories 103.

In order to increase the accuracy of search results (e.g., files retrieved by the crawling layer 122), the validation engine 130 monitors and determines use of the divisions 105 generated by the division generation layer 127 and/or of the respective ones of the ranked files in the divisions 105. The validation engine 130 further predicts relevance of the divisions 105 generated by the division generation layer 127 and/or of the respective ones of the ranked files in the divisions 105 to the input string based at least in part on the use. The predicting is performed using one or more machine learning algorithms.

The validation engine 130 rates the search results based on acceptance rate. For example, user interaction with divisions 105 and/or files is recorded and may include, for example, the number of times a division and/or file has been accessed, copied and/or moved, the duration of user access and other indications of use. The indications of use are compiled by the validation engine 130 to compute an acceptance score for each division and/or file. High division or file use will lead to higher acceptance scores, while low or no division or file use will lead to lower acceptance rate scores. The acceptance rate scores and the corresponding input strings on which the retrieval of the files were based will be fed back to a machine learning model as training data to train the machine learning model on which file strings are most relevant to particular input strings. The failure or success rate for different divisions 105 and/or files may be stored and utilized as training data to improve search results for subsequent searches based on the same or similar input queries. In a non-limiting operational example, based on input from the validation engine 130, the machine learning algorithm is configured to be trained to recognize that differences in presentation may pertain to the same subject matter. For example, the algorithm is trainable to recognize that "SSD" and "Solid-State-Drive" refer to the same component, making the algorithm more efficient and intelligent.

Although shown as elements of the data repository management platform 110, the content generation engine 120, validation engine 130 and/or interface engine 140 in other embodiments can be implemented at least in part externally to the data repository management platform 110, for example, as stand-alone servers, sets of servers or other types of systems coupled to the network 104. For example, the content generation engine 120, validation engine 130 and/or interface engine 140 may be provided as cloud services accessible by the data repository management platform 110.

The content generation engine 120, validation engine 130 and/or interface engine 140 in the FIG. 1 embodiment are each assumed to be implemented using at least one processing device. Each such processing device generally comprises at least one processor and an associated memory, and implements one or more functional modules for controlling certain features of the content generation engine 120, validation engine 130 and/or interface engine 140.

At least portions of the data repository management platform 110 and the elements thereof may be implemented at least in part in the form of software that is stored in memory and executed by a processor. The data repository management platform 110 and the elements thereof comprise further hardware and software required for running the data repository management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the content generation engine 120, validation engine 130, interface engine 140 and other elements of the data repository management platform 110 in the present embodiment are shown as part of the data repository management platform 110, at least a portion of the content generation engine 120, validation engine 130, interface engine 140 and other elements of the data repository management platform 110 in other embodiments may be implemented on one or more other processing platforms that are accessible to the data repository management platform 110 over one or more networks. Such elements can each be implemented at least in part within another system element or at least in part utilizing one or more stand-alone elements coupled to the network 104.

It is assumed that the data repository management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the content generation engine 120, validation engine 130, interface engine 140 and other elements of the data repository management platform 110, and the elements thereof can each be implemented in the form of one or more LXCs running on one or more VMs. Other arrangements of one or more processing devices of a processing platform can be used to implement the content generation engine 120, validation engine 130 and interface engine 140, as well as other elements of the data repository management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the data repository management platform 110 to reside in different data centers. Numerous other distributed implementations of the data repository management platform 110 are possible.

Accordingly, one or each of the content generation engine 120, validation engine 130, interface engine 140 and other elements of the data repository management platform 110 can each be implemented in a distributed manner so as to comprise a plurality of distributed elements implemented on respective ones of a plurality of compute nodes of the data repository management platform 110.

It is to be appreciated that these and other features of illustrative embodiments are presented by way of example only, and should not be construed as limiting in any way. Accordingly, different numbers, types and arrangements of system elements such as the content generation engine 120, validation engine 130, interface engine 140 and other elements of the data repository management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the data repository management platform can be offered to cloud infrastructure customers or other users as part of FaaS, CaaS and/or PaaS offerings.

Figure 4:
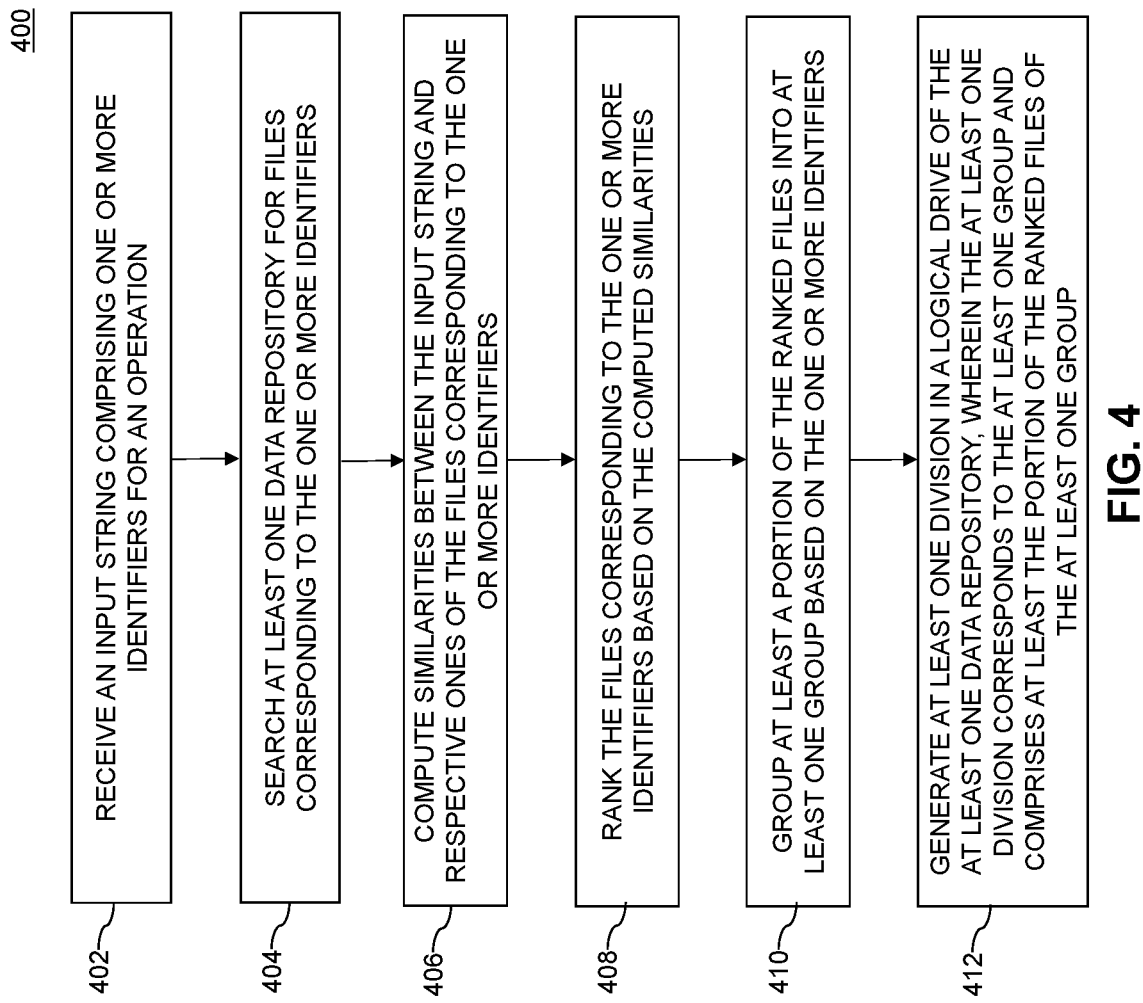
FIG. 4 is a flow diagram of an exemplary process for data repository management in an illustrative embodiment.

The operation of the information processing system 100 will now be described in further detail with reference to the flow diagram of FIG. 4. With reference to FIG. 4, a process 400 for data repository management as shown includes steps 402 through 412, and is suitable for use in the system 100 but is more generally applicable to other types of information processing systems comprising a data repository management platform configured for compiling and controlling the compilation of product supporting materials.

In step 402, an input string comprising one or more identifiers for an operation is received. The one or more identifiers comprise, for example, a product model name, a product model number, a component name, a component model number, a software version and/or a hardware version. In step 404, at least one data repository is searched for files corresponding to the one or more identifiers.

In step 406, similarities are computed between the input string and respective ones of the files corresponding to the one or more identifiers. Computing the similarities between the input string and the respective ones of the files comprises computing a minimum edit distance between the input string and a string of a file of the respective ones of the files, wherein the string of the file comprises at least a portion of one of a file name, a metadata tag of the file, a header of the file and a body of the file. The minimum edit distance comprises a minimum number of edit operations required to convert the string of the file into the input string. In illustrative embodiments, computing the minimum edit distance comprises discounting an order of two or more character combinations in each of the input string and the string of the file.

In step 408, the files corresponding to the one or more identifiers are ranked based on the computed similarities. In step 410, at least a portion of the ranked files are grouped into at least one group based on the one or more identifiers. Grouping at least the portion of the ranked files into the at least one group may comprise: (i) grouping a subset of the ranked files into at least a first group corresponding to a first identifier of the one or more identifiers, wherein respective files of the subset comprise a string including the first identifier; and (ii) grouping an additional subset of the ranked files into at least a second group corresponding to a second identifier of the one or more identifiers, wherein respective files of the additional subset comprise a string including the second identifier. In some embodiments, the grouping may comprise grouping another subset of the ranked files into another group, wherein respective files of the other subset lack a string including the one or more identifiers.

In step 412, at least one division in a logical drive of the at least one data repository is generated, wherein the at least one division corresponds to the at least one group and comprises at least the portion of the ranked files of the at least one group. The at least one division can comprise a folder of the logical drive. At least one temporary division comprising the ranked files prior to the grouping of at least the portion of the ranked files into the at least one group may also be generated in the logical drive of the at least one data repository. An API and/or a programmatic interface is implemented to interface with the at least one data repository to generate the at least one division and/or temporary division in the logical drive of the at least one data repository.

In illustrative embodiments, the method further includes monitoring and determining use of the at least one division and/or at least the portion of the ranked files, and predicting relevance of the at least one division and/or at least the portion of the ranked files to the input string based at least in part on the use. The predicting is performed using one or more machine learning algorithms.

It is to be appreciated that the FIG. 4 process and other features and functionality described above can be adapted for use with other types of information systems configured to execute data repository management services in a data repository management platform or other type of platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a data repository management platform as disclosed herein can provide a number of significant advantages relative to conventional arrangements. For example, the data repository management platform creates logical storage divisions for users based on incoming queries so that supporting materials from previously completed projects can be automatically compiled and reused for new projects.

The embodiments further provide technical solutions that permit a machine learning algorithm to be trained to recognize supporting materials that are relevant to incoming queries based on use of previously ranked and categorized materials. The framework is also adaptable to be interfaced with multiple different OS and repository types. As an additional advantage, the embodiments permit users to define different criteria for grouping supporting materials and allow for the generation of the logical divisions based on created groups. As a result, project folders are created with greater efficiency and accuracy, thereby reducing consumption of crucial compute resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the data repository management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data repository management platform in illustrative embodiments. These and other cloud-based systems in illustrative embodiments can include object stores.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
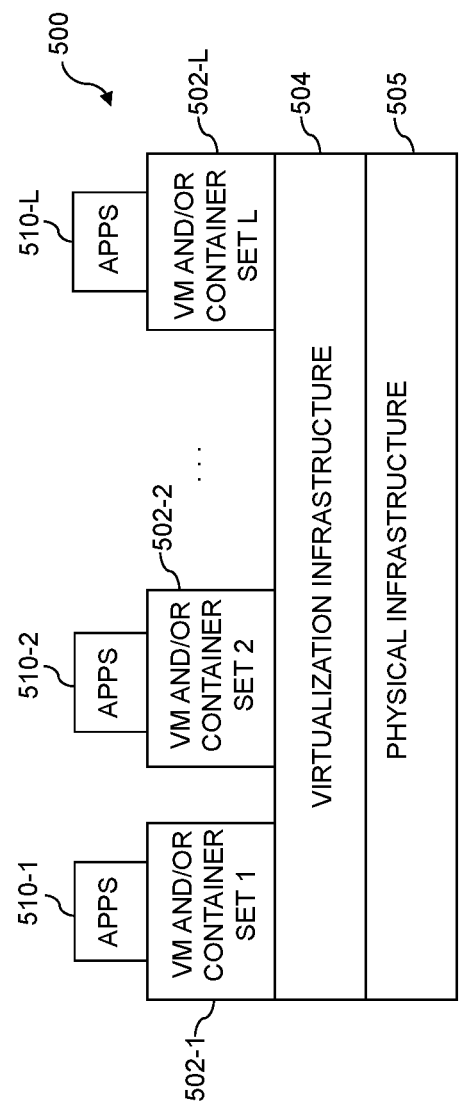
FIGS. 5 and 6 show examples of processing platforms that may be utilized to implement at least a portion of an information processing system according to illustrative embodiments.
Figure 6:
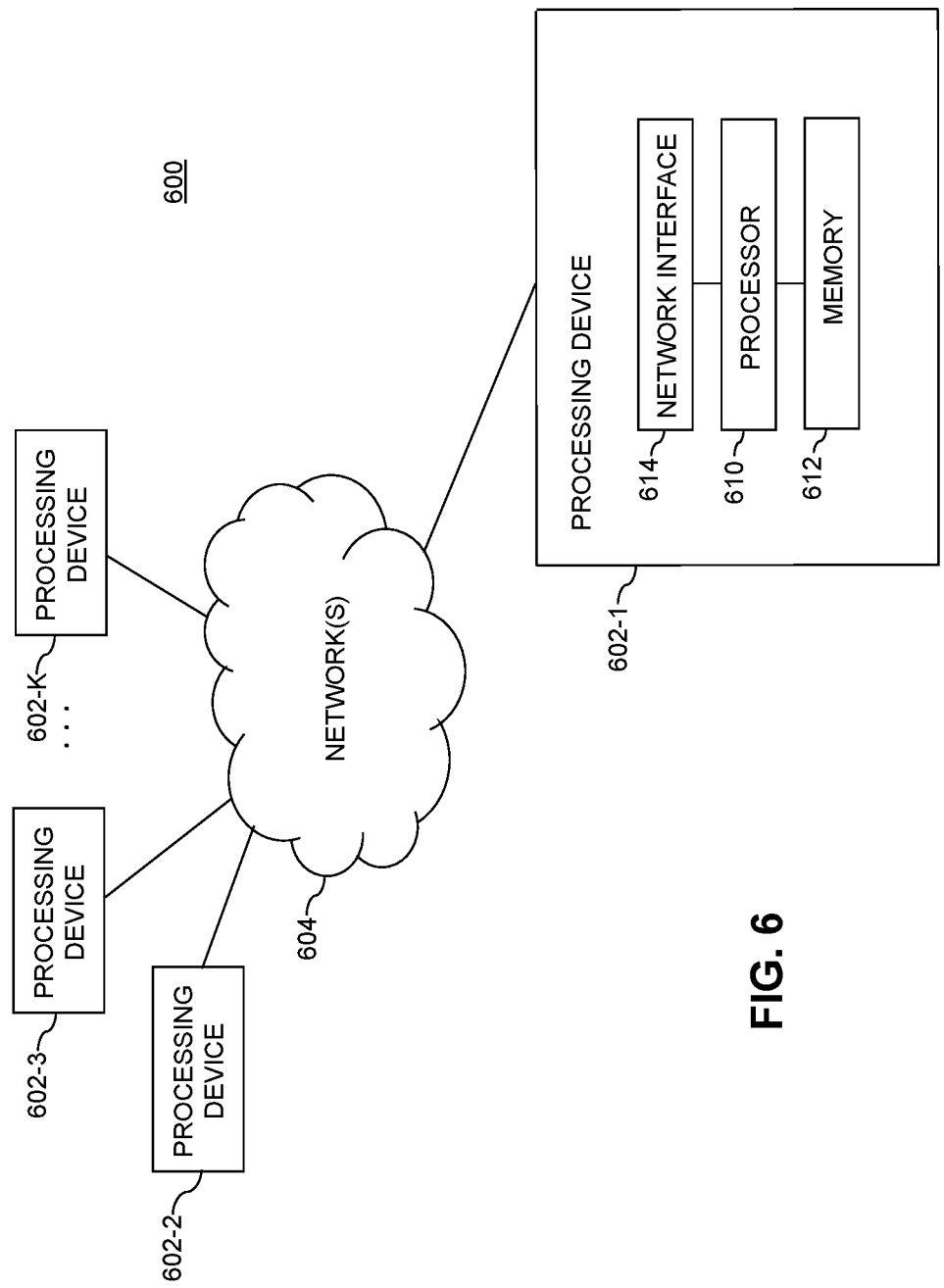

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612. The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the data repository management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and data repository management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    receiving an input string comprising one or more identifiers for an operation;
    searching at least one data repository for files corresponding to the one or more identifiers;
    receiving one or more criteria corresponding to at least one of the one or more identifiers;
    computing similarities, with one or more machine learning models, between the input string and respective ones of the files corresponding to the one or more identifiers;
    ranking, with the one or more machine learning models, the files corresponding to the one or more identifiers based on the computed similarities and the one or more criteria;
    grouping, with the one or more machine learning models, at least a portion of the ranked files into at least one group based on the ranking of the files using the one or more identifiers and the one or more criteria;
    generating at least one division in a logical drive of the at least one data repository based on the received input string, wherein the at least one division corresponds to the at least one group and comprises at least the portion of the ranked files of the at least one group;
    monitoring and determining, with the one or more machine learning models, a use of the at least one division and at least the portion of the ranked files;
    predicting relevance of at least one of the at least one division and at least the portion of the ranked files to the input string based at least in part on the use, wherein the predicting is performed using another machine learning algorithm; and
    inputting the predicted relevance and the input string into the one or more machine learning models to retrain the one or more machine learning models to identify and reuse files relevant to one or more additional input strings based on the use of at least one of the at least one division and at least the portion of the ranked files;
    wherein the method is executed by a processing device operatively coupled to a memory.

2. The method of claim 1 wherein computing the similarities between the input string and the respective ones of the files corresponding to the one or more identifiers comprises computing a minimum edit distance between the input string and a string of a file of the respective ones of the files, wherein the string of the file comprises at least a portion of one of a file name, a metadata tag of the file, a header of the file and a body of the file.

3. The method of claim 2 wherein the minimum edit distance comprises a minimum number of edit operations required to convert the string of the file into the input string.

4. The method of claim 2 wherein computing the minimum edit distance comprises discounting an order of two or more character combinations in each of the input string and the string of the file.

5. The method of claim 1 wherein the one or more identifiers comprise at least one of a product model name, a product model number, a component name and a component model number.

6. The method of claim 1 wherein the one or more identifiers comprise at least one of a software version and a hardware version.

7. The method of claim 1 wherein grouping at least the portion of the ranked files into the at least one group based on the one or more identifiers comprises grouping a subset of the ranked files into at least a first group corresponding to a first identifier of the one or more identifiers, wherein respective files of the subset comprise a string including the first identifier.

8. The method of claim 7 wherein grouping at least the portion of the ranked files into the at least one group based on the one or more identifiers further comprises grouping an additional subset of the ranked files into at least a second group corresponding to a second identifier of the one or more identifiers, wherein respective files of the additional subset comprise a string including the second identifier.

9. The method of claim 7 wherein grouping at least the portion of the ranked files into the at least one group based on the one or more identifiers further comprises grouping an additional subset of the ranked files into at least a second group, wherein respective files of the additional subset lack a string including the one or more identifiers.

10. The method of claim 1 further comprising generating at least one temporary division in the logical drive of the at least one data repository, wherein the at least one temporary division comprises the ranked files prior to the grouping of at least the portion of the ranked files into the at least one group.

11. The method of claim 1 wherein the at least one division comprises a folder of the logical drive.

12. The method of claim 1 further comprising implementing at least one of an application programming interface and a programmatic interface to interface with the at least one data repository to generate the at least one division in the logical drive of the at least one data repository.

13. An apparatus comprising:
a processing device operatively coupled to a memory and configured:
to receive an input string comprising one or more identifiers for an operation;
to search at least one data repository for files corresponding to the one or more identifiers;
to receive one or more criteria corresponding to at least one of the one or more identifiers;
to compute similarities, using one or more machine learning models, between the input string and respective ones of the files corresponding to the one or more identifiers;
to rank, using the one or more machine learning models, the files corresponding to the one or more identifiers based on the computed similarities and the one or more;
to group, using the one or more machine learning models, at least a portion of the ranked files into at least one group based on the ranking of the files using the one or more identifiers and the one or more criteria;
to generate at least one division in a logical drive of the at least one data repository based on the received input string, wherein the at least one division corresponds to the at least one group and comprises at least the portion of the ranked files of the at least one group;
monitor and determine, using the one or more machine learning models, a use of the at least one division and at least the portion of the ranked files;
predict relevance of at least one of the at least one division and at least the portion of the ranked files to the input string based at least in part on the use, wherein the predicting is performed using another machine learning algorithm; and
input the predicted relevance and the input string into the one or more machine learning models to retrain the one or more machine learning models to identify and reuse files relevant to one or more additional input strings based on the use of at least one of the at least one division and at least the portion of the ranked files.

14. The apparatus of claim 13 wherein, in grouping at least the portion of the ranked files into the at least one group based on the one or more identifiers, the processing device is configured to group a subset of the ranked files into at least a first group corresponding to a first identifier of the one or more identifiers, wherein respective files of the subset comprise a string including the first identifier.

15. The apparatus of claim 14 wherein, in grouping at least the portion of the ranked files into the at least one group based on the one or more identifiers, the processing device is further configured to group an additional subset of the ranked files into at least a second group corresponding to a second identifier of the one or more identifiers, wherein respective files of the additional subset comprise a string including the second identifier.

16. The apparatus of claim 14 wherein, in grouping at least the portion of the ranked files into the at least one group based on the one or more identifiers, the processing device is further configured to group an additional subset of the ranked files into at least a second group, wherein respective files of the additional subset lack a string including the one or more identifiers.

17. An article of manufacture comprising a non-transitory processor-readable storage medium having stored therein program code of one or more software programs, wherein the program code when executed by at least one processing device causes said at least one processing device to perform the steps of:
receiving an input string comprising one or more identifiers for an operation;
searching at least one data repository for files corresponding to the one or more identifiers;
receiving one or more criteria corresponding to at least one of the one or more identifiers;
computing similarities, with one or more machine learning models, between the input string and respective ones of the files corresponding to the one or more identifiers;
ranking, with the one or more machine learning models, the files corresponding to the one or more identifiers based on the computed similarities and the one or more criteria;
grouping, with the one or more machine learning models, at least a portion of the ranked files into at least one group based on the ranking of the files using the one or more identifiers and the one or more criteria;
generating at least one division in a logical drive of the at least one data repository based on the received input string, wherein the at least one division corresponds to the at least one group and comprises at least the portion of the ranked files of the at least one group;
monitoring and determining, with the one or more machine learning models, a use of the at least one division and at least the portion of the ranked files;
predicting relevance of at least one of the at least one division and at least the portion of the ranked files to the input string based at least in part on the use, wherein the predicting is performed using another machine learning algorithms; and
inputting the predicted relevance and the input string into the one or more machine learning models to retrain the one or more machine learning models to identify and reuse files relevant to one or more additional input strings based on the use of at least one of the at least one division and at least the portion of the ranked files.

18. The article of manufacture of claim 17 wherein, in grouping at least the portion of the ranked files into the at least one group based on the one or more identifiers, the program code causes said at least one processing device to group a subset of the ranked files into at least a first group corresponding to a first identifier of the one or more identifiers, wherein respective files of the subset comprise a string including the first identifier.

19. The article of manufacture of claim 18 wherein, in grouping at least the portion of the ranked files into the at least one group based on the one or more identifiers, the program code further causes said at least one processing device to group an additional subset of the ranked files into at least a second group corresponding to a second identifier of the one or more identifiers, wherein respective files of the additional subset comprise a string including the second identifier.

20. The apparatus of claim 13 wherein computing the similarities between the input string and the respective ones of the files corresponding to the one or more identifiers comprises computing a minimum edit distance between the input string and a string of a file of the respective ones of the files, wherein the string of the file comprises at least a portion of one of a file name, a metadata tag of the file, a header of the file and a body of the file.

* * * * *